(No Model.)
L. E. GLAZIER.
STANCHION.
No. 456,269. Patented July 21, 1891.
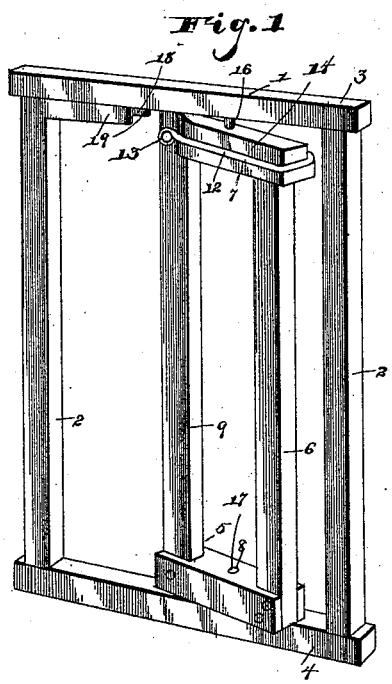
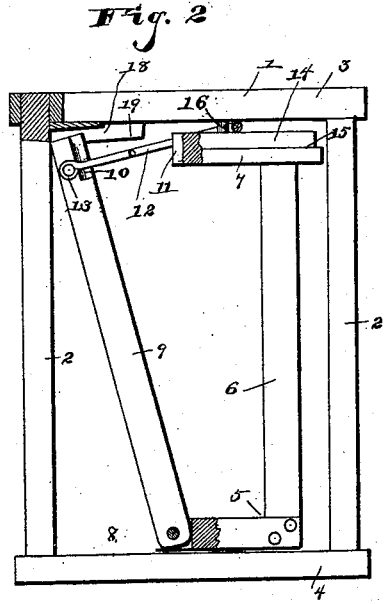
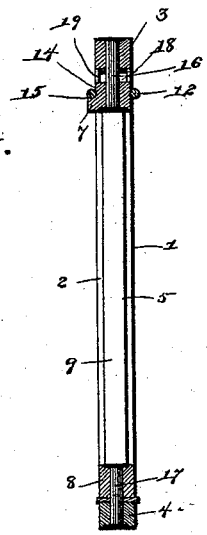
Witnesses
Samuel Ker.
H. J. Riley
Inventor
Luke E. Glazier
By his Attorneys,
C. A. Snow & Co.

UNITED STATES PATENT OFFICE.

LUKE ELWIN GLAZIER, OF NORTH HAVERHILL, NEW HAMPSHIRE.

STANCHION.

SPECIFICATION forming part of Letters Patent No. 456,269, dated July 21, 1891.

Application filed June 23, 1890. Serial No. 356,480. (No model.)

*To all whom it may concern:*

Be it known that I, LUKE ELWIN GLAZIER, a citizen of the United States, residing at North Haverhill, in the county of Grafton and State of New Hampshire, have invented a new and useful Stanchion, of which the following is a specification.

The invention relates to improvements in stanchions.

The object of the present invention is to simplify and improve the construction of stanchions and to provide a device capable of being securely locked and adapted to effectually withstand the attempt of a confined animal to release itself.

The invention consists in the construction and novel combination and arrangement of parts, hereinafter fully described, illustrated in the accompanying drawings, and pointed out in the claim hereto appended.

In the drawings, Figure 1 is a perspective view of a stanchion embodying the invention. Fig. 2 is a side elevation, partly in section, the pivoted frame being open and adapted to receive an animal. Fig. 3 is a transverse sectional view.

Referring to the accompanying drawings, 1 designates a stationary rectangular frame, comprising vertical standards or beams 2 and top and bottom cross-pieces 3 and 4, connecting the ends of the standards or beams and having pivoted between them a movable frame 5. The movable frame 5 is composed of a vertical bar 6, top and bottom cross-pieces 7 and 8, and a bar 9, hinged to one end of the bottom cross-piece 8 and having its upper end oppositely recessed to provide a reduced portion 10, arranged to engage a recess 11 in one end of the top cross-piece, and the upper end of the hinged bar 9 is provided with a wire bail or loop 12, having eyes 13 at its ends pivoted to the hinged bar and being adapted, when the pivoted frame is closed and the bars 6 and 9 are parallel, to fit snugly around the upper portion 14 of the top cross-piece 7 and rest upon a shoulder 15, extending around one side and one end of the top cross-piece and being formed by rabbeting the same and being adapted to shield the loop and prevent the same being accidentally raised and lifted out of engagement with the cross-piece by the horn of the confined animal. The cross-pieces are provided with perforations through which extend pivots 16 and 17, which secure the movable frame to the stationary frame, and the ends of the bar 6 are mortised in the cross-pieces 7 and 8, and the lower end of the hinged bar 9 is tenoned and pivoted in a slot of the bottom cross-piece. The upper end of the hinged bar extends above the top cross piece or head, and when the pivoted frame is opened for the reception of the head of an animal, the upper end of the hinge-bar slides in a groove or way 18, formed by strips 19, secured to the lower face of the top cross-piece of the stationary rectangular frame adjacent to one of the beams or standards 2. By this construction it will be seen that an animal is securely confined in the pivoted or swinging frame 5, and is prevented releasing himself, and that the movable frame is held stationary when its parts are open.

From the foregoing description and the accompanying drawings the construction, operation, and advantages of the invention will be readily understood.

What I claim is—

In a stanchion, the combination of the stanchion-frame provided on the lower face of the top bar with the parallel strips 19, having their ends beveled and forming a groove or way 18, the movable frame pivotally mounted in the stanchion-frame and comprising the bottom cross-piece 8, the top cross-piece provided at one end with a recess 11 and having a shoulder 15, extending around the side and end where the head of the animal will be, the vertical bar 6, rigidly secured to the top and bottom bars, and the bar 9, pivoted to the bottom bar and having its upper end oppositely recessed and provided with the reduced portion 10 and the shoulders, said reduced portion fitting in the recess 11 of the top bar and the shoulders engaging the end thereof, and the loop attached to the upper end of the bar 9 and arranged to encircle the top bar and rest upon the shoulder 15 and be thereby protected from the horns of cattle, whereby the bar 9 is prevented from becoming separated and disconnected from the top bar, substantially as described.

In testimony that I claim the foregoing as my own I have hereto affixed my signature in presence of two witnesses.

LUKE ELWIN GLAZIER.

Witnesses:
W. F. WESTGATE,
CLARA E. BOWEN.